United States Patent
Williams (10) Patent No.: US 8,069,315 B2
(45) Date of Patent: Nov. 29, 2011

(54) SYSTEM AND METHOD FOR PARALLEL SCANNING

(75) Inventor: Michael G. Williams, Newbury Park, CA (US)

(73) Assignee: Nokia Corporation (FI)

(*) Notice: Subject to any disclaimer, the term of this patent is extended or adjusted under 35 U.S.C. 154(b) by 540 days.

(21) Appl. No.: 11/848,166

(22) Filed: Aug. 30, 2007

(65) Prior Publication Data

US 2009/0063809 A1 Mar. 5, 2009

(51) Int. Cl.
G06F 12/08 (2006.01)
(52) U.S. Cl. ............... 711/149; 711/156; 711/E12.007; 710/55; 726/22
(58) Field of Classification Search ............. 711/149
See application file for complete search history.

(56) References Cited

U.S. PATENT DOCUMENTS

| | | | |
|---|---|---|---|
| 5,491,802 A * | 2/1996 | Thompson et al. | 709/236 |
| 6,901,519 B1 * | 5/2005 | Stewart et al. | 726/24 |
| 7,854,008 B1 * | 12/2010 | Huang et al. | 726/24 |
| 2002/0037011 A1 * | 3/2002 | Musoll et al. | 370/400 |
| 2005/0086499 A1 * | 4/2005 | Hoefelmeyer et al. | 713/188 |
| 2006/0064755 A1 * | 3/2006 | Azadet et al. | 726/24 |
| 2006/0101282 A1 * | 5/2006 | Costea et al. | 713/188 |
| 2006/0156401 A1 * | 7/2006 | Newstadt et al. | 726/22 |
| 2007/0079178 A1 * | 4/2007 | Gassoway | 714/38 |
| 2007/0192863 A1 | 8/2007 | Kapoor et al. | |
| 2007/0233628 A1 * | 10/2007 | Sherwood et al. | 706/46 |
| 2007/0250930 A1 | 10/2007 | Aziz | |
| 2008/0077995 A1 * | 3/2008 | Curnyn | 726/27 |
| 2009/0013407 A1 * | 1/2009 | Doctor et al. | 726/23 |

FOREIGN PATENT DOCUMENTS

| | | | |
|---|---|---|---|
| WO | WO 03/094418 A | 11/2003 | |
| WO | WO 2005/027539 A | 3/2005 | |
| WO | WO 2006/030227 A | 3/2006 | |
| WO | WO 2007/054679 A | 5/2007 | |

OTHER PUBLICATIONS

Stephen G. Kochan. Programming in C. Jul. 2004. Sams Publishing. 3rd Ed. pp. 387-388.*
John L. Hennessy and David A. Patterson. Computer Architecture: A Quantitative Approach. Morgan Kaufmann. 3rd ed. pp. 460-461.*

* cited by examiner

*Primary Examiner* — Reginald Bragdon
*Assistant Examiner* — Nathan Sadler
(74) *Attorney, Agent, or Firm* — Banner & Witcoff, Ltd.

(57) ABSTRACT

A system and method for parallel scanning among multiple scanning entities. According to various embodiments of the present invention, buffers are allocated from a pool of memory pages, with one packet being located on each page. Each of the pages is mapped such that unprivileged scanners, privileged scanners, and hardware-based scanners are all capable of accessing the pages. By having the packets located on separate pages, additional data other than the packets at issue do not have to be shared, and copying is not necessary to complete the scanning process.

27 Claims, 5 Drawing Sheets

SYSTEM AND METHOD FOR PARALLEL SCANNING

FIELD OF THE INVENTION

The present invention relates generally to security technologies for use with a device or network. More particularly, the present invention relates to the scanning of data packets by multiple technologies for security purposes.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In perimeter security, the firewall is the typical first line of defense for a network. A firewall is a collection of security measures that are used to prevent unauthorized electronic access to a computer system or network. In terms of the overall protection of a network, "defense in depth" refers to the application of multiple layers of security technologies (referred to herein as "scanners") at the perimeter of the network and within the network in order to protect it. In recent years, there has been a trend towards the combining multiple security technologies or scanners within a single device. Although such combinations of scanners makes security management easier, it also results in a significantly higher demand on the device that is performing the scanning in terms of both performance and flexibility.

Virtual memory is a system for dynamically mapping a program's address or addresses to one or more physical memory addresses. In an unprivileged mode of execution, an individual computer program cannot access any of the device's physical memory other than its own, and the program cannot run special instructions in the processor that can affect the hardware state for other programs. The unprivileged mode is also referred to as a user-mode. In a privileged mode of execution, the computer program can access any part of the computer hardware and may modify aspects of other programs. The privileged mode of execution typically refers to the operating system (OS) of the device. Still further, the device at issue typically contains firmware, which is the software that is preinstalled within an execution unit.

With regard to the security technologies or scanners that are used within and at the perimeter of a network, many of these technologies are implemented as software programs that run in the unprivileged mode on the operating system. Additionally, other technologies run in the privileged mode, while others are built into the firmware of special purpose hardware. This creates a significant issue, as the three different implementations of these technologies (unprivileged, privileged and hardware) have conventionally been incompatible with the other. Additionally, these technologies tend to be run in a serialized manner and tend to run at different rates. Still further, these technologies typically require that the data to be scanned be delivered in different layers of the protocol stack from each other. Because the technologies are run in different modes, they also tend not to be capable of sharing memory with each other, resulting in a requirement for making copies of the data to be scanned.

In some previous implementations, the above issues have been addressed by having separate hardware inline for each type of scanner (e.g., stand-alone firmware, intrusion detection and prevention (IDP) software, anti-virus software, etc.) Attempts to address the above-identified issues have also involved running each scanner on separate software blades, and then broadcasting or coping the packets to each blade.

SUMMARY OF THE INVENTION

Various embodiments of the present invention provide for a parallel scanning method. Various embodiments of the present invention involve a method of mapping, queuing and marking packets of network traffic in order to apply multiple scanning technologies which are implemented in different modes in parallel with each other. This arrangement increases the efficiency and speed of processing packets of data, while also permitting the different implementation modes to operate together.

Additionally, it is noted that unprivileged scanners have virtual memory space allocated for holding packets, such that each packet is on a separate physical memory page. Various embodiments of the present invention help to eliminate the necessity for copies of data as discussed previously. Various embodiments also serve to decrease the amount of time it takes to scan a packet for multiple security risks by allowing the process to occur in parallel rather than in series.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Various embodiments of the present invention provide for a parallel scanning method. Various embodiments of the present invention involve a method of mapping, queuing and marking packets of network traffic in order to apply multiple scanning technologies which are implemented in different modes in parallel with each other. This arrangement increases the efficiency and speed of processing packets of data, while also permitting the different implementation modes to operate together.

Figure 1:
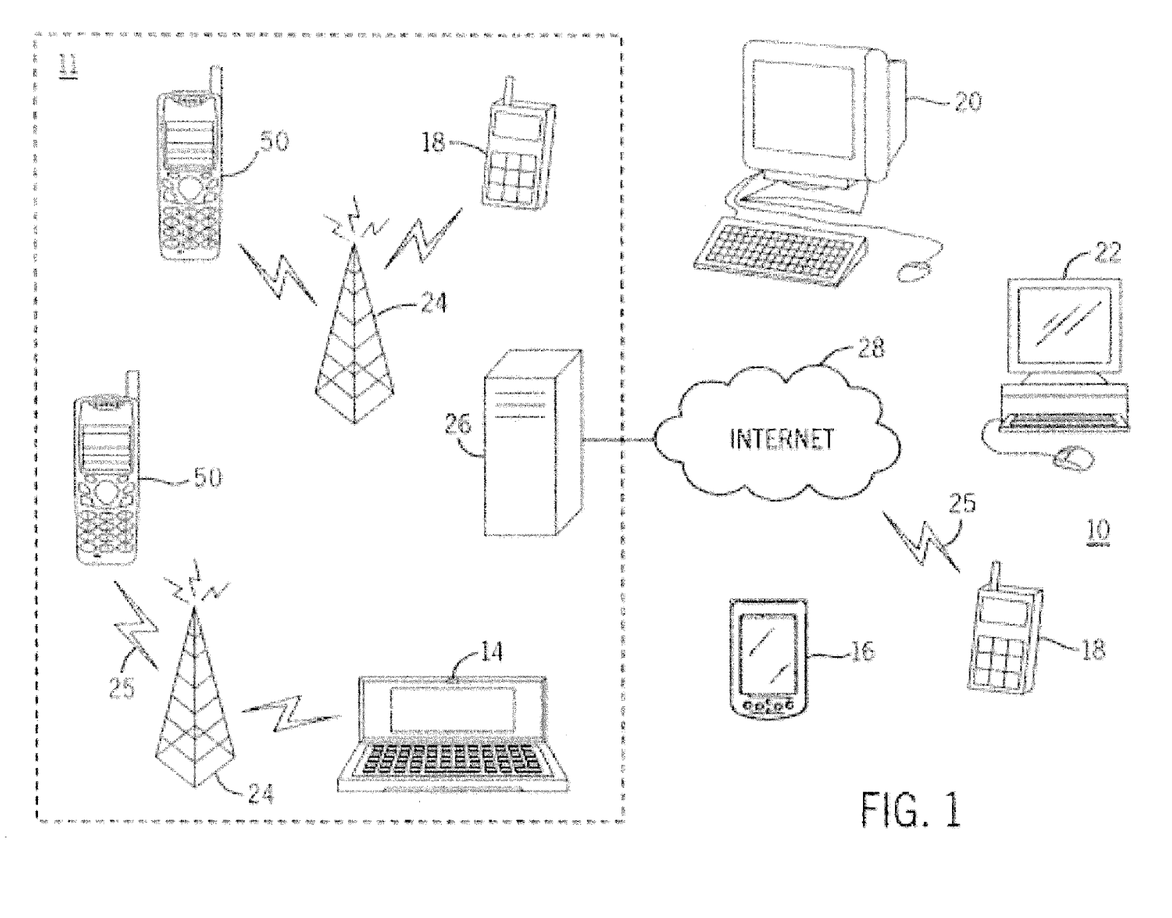
FIG. 1 is an overview diagram of a system within which various embodiments of the present invention may be implemented.

FIG. 1 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a electronic device 50, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 2:
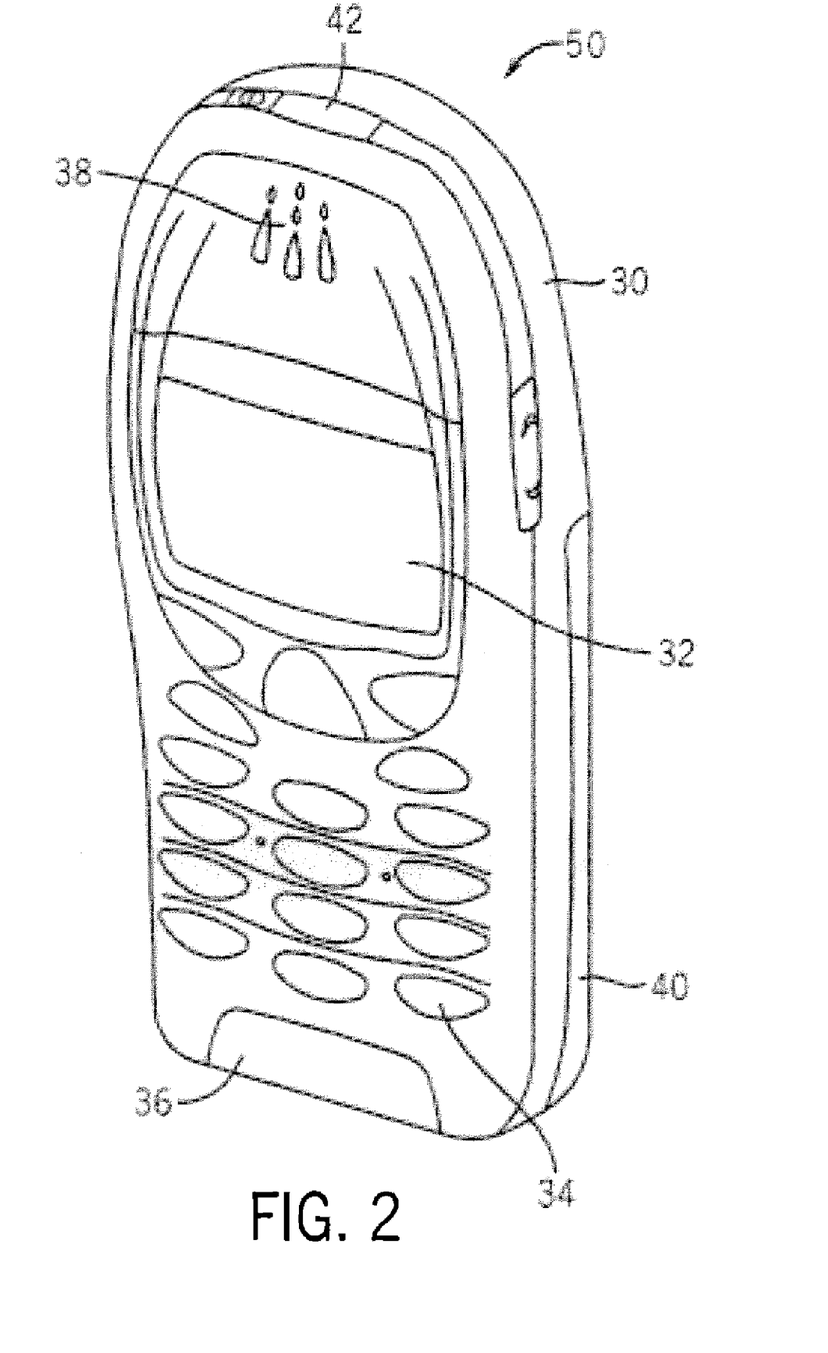
FIG. 2 is a perspective view of an electronic device that can be used in conjunction with the implementation of various embodiments of the present invention.
Figure 3:
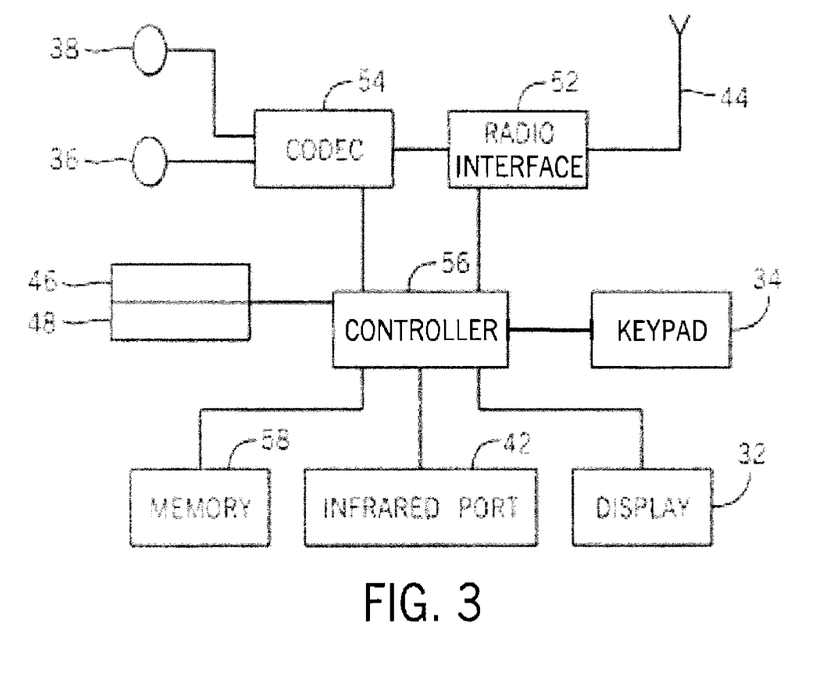
FIG. 3 is a schematic representation of the circuitry which may be included in the electronic device of FIG. 2.

FIGS. 2 and 3 show one representative electronic device 50 within which the present invention may be implemented. It should be understood, however, that the present invention is not intended to be limited to one particular type of device. The electronic device 50 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Figure 4:
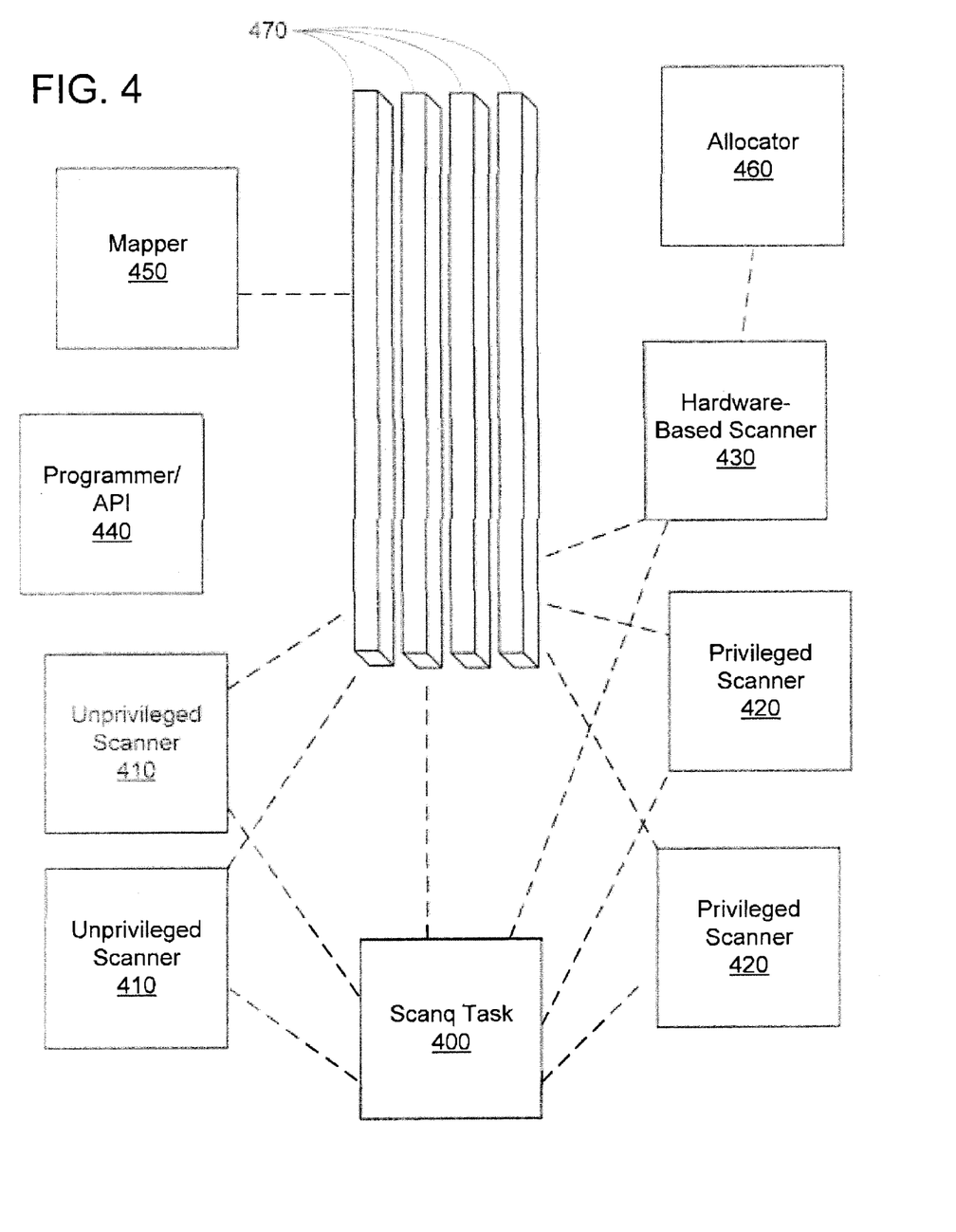
FIG. 4 is a representation showing the interaction among various components during the implementation of various embodiments of the present invention.

FIG. 4 is a representation of various systems and components which are used in the implementation of various embodiments of the present invention. The system represented in FIG. 4 includes at least one unprivileged scanner 410, at least one privileged scanner 420, and hardware-based scanner 430. The implementation also includes a system for programming (referred to herein as a programmer 440) user mode applications to enable them to share memory and scan in parallel. A common type of programmer 440 is an application programming interface (API), although other programmers may also be used. The system depicted in FIG. 4 also includes a mapper 450 for allocating and mapping memory buffers that hold the data packets so that they do not need to be copied or shifted in memory. An allocator 460 is also used to allocate certain network protocol processing tasks to the hardware scanner 430 when present.

In addition to the above, the system depicted in FIG. 4 includes a program, referred to herein as a scanq task 400 or queuing task manager, that is configured to add new data packets and remove completed scanning packets from the queue of packets being scanned by the privileged scanners 420, the unprivileged scanners 410 and the hardware-based scanner 430. The scanq task 400 allocates buffers from a pool of memory pages 470, with one packet per memory page 470. The memory pages 470 are mapped so that all of the unprivileged mode scanners 410 can access the same packet, the privileged scanners 420 can access it, and the hardware scanner 430 can also access it. In this arrangement, each packet is located on a separate memory page 470 in order to avoid the various scanners having to share data other than the desired packets. The scanq task 400 records how many scanners are in the system, as well as where each scanner places its "drop mark" at the end of a packet buffer.

During use, the hardware scanner 430 optimally prepares the packet to be aligned so that the layer 3 frame of the packet is placed in the same offset to the memory page 470, regardless of the size of the layer 2 header for the packet. Although this often results in a small amount of space in the beginning of the memory page 470 remaining unused when a packet's layer 2 header is smaller than the largest packet's layer 2 header, this aligning method avoids having to shift the packet data around in the memory in order to align it later. The hardware scanner 430 also completes layer 3 defragmentation and assembly tasks, and also computes the checksum in order to detect any errors the data.

During the scanning process, each of the scanners indicates when they have completed scanning buffers by inserting a mark on the end of the appropriate buffer page beyond the packet data. The scanner at issue then invokes the scanq task 400 to see if the last scan has occurred (i.e., if other scanners still need to scan the buffer). If not, then the scanq provides the buffer at issue to any other scanners that indicate they are ready for a packet. On the other hand, if the packet at issue has been inspected/scanned by all of the scanners, as indicated by the presence of drop marks, then the task scanq 400 drops the packet.

Figure 5:
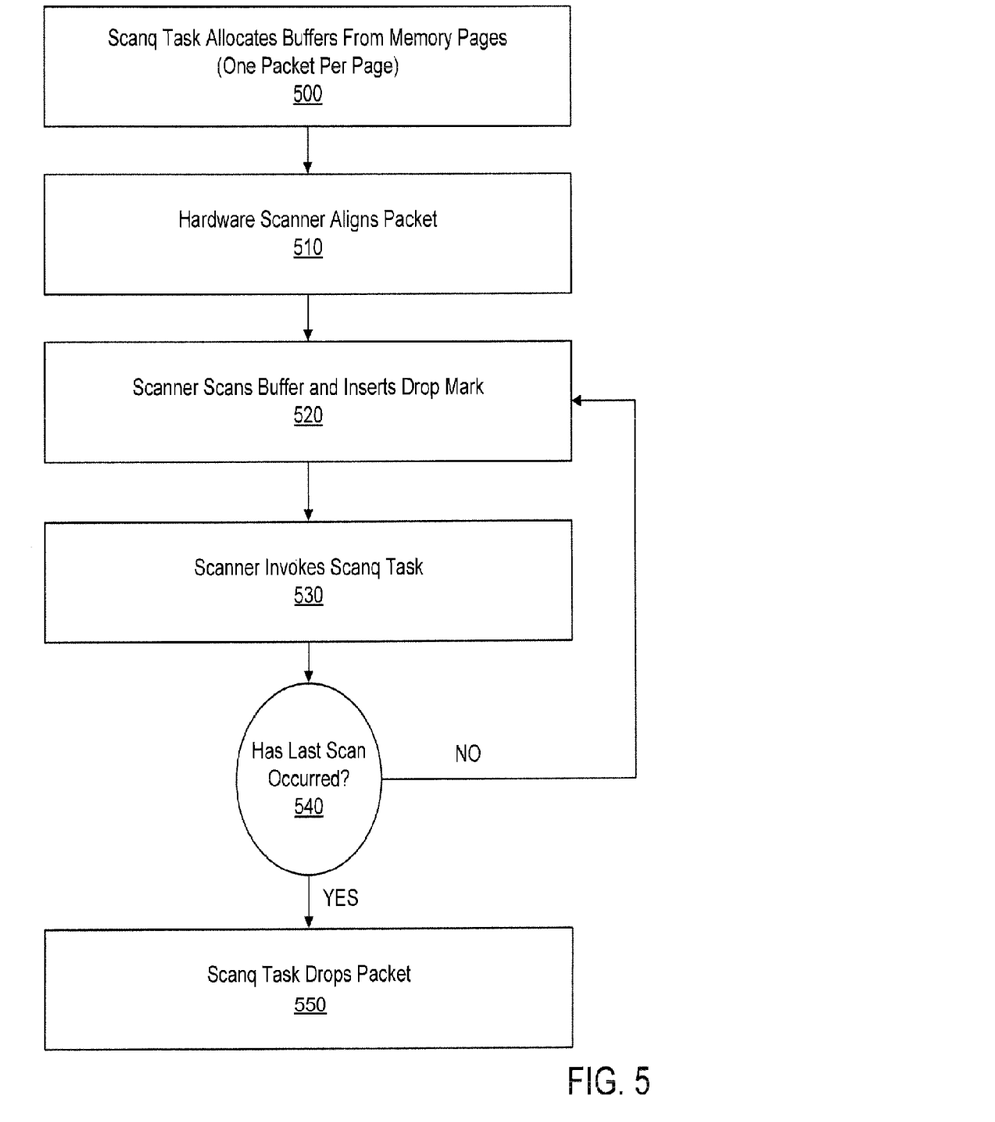
FIG. 5 is a flow chart depicting the implementation of various embodiments of the present invention.

FIG. 5 is a flow chart depicting the implementation of various embodiments of the present invention. At 500 in FIG. 5, the scanq task 400 allocates buffers from the memory pages, with one packet being located on each page. At 510 and in one embodiment, the hardware-base scanner 430 aligns the packet appropriately on its respective page. At 520, one of the scanners in the system, be it the hardware-based scanner 430, a privileged scanner 420, or an unprivileged scanner 410, proceeds to scan a buffer and inserts its own drop mark after the packet located on the page. At 530, the scanner at issue invokes the scanq task 400, after which it is determined at 540 whether all of the scanners have completed their scans of the packet. If the "last scan" has not occurred, then the process returns to 520 for another scanner to perform its scan. On the other hand, if the last scan has occurred, then the scanq task 400 proceeds to drop the packet at 550, since no additional scans of it are required.

The various embodiments of the present invention described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated.

What is claimed is:

1. A method, comprising:
   allocating, at a computing device, one or more memory page buffers from a plurality of memory pages, wherein allocating the one or more memory page buffers results in one or more allocated memory page buffers, and, upon completion of the allocating, each allocated memory page buffer of the one or more allocated memory page buffers includes a data packet; and
   when allocating the one or more memory page buffers is complete, performing a parallel scan of the one or more allocated memory page buffers with a plurality of scanners, wherein the parallel scan includes:
      initiating a scan of a first allocated memory page buffer of the one or more allocated memory page buffers, wherein the scan of the first allocated memory page buffer includes scanning the first allocated memory page buffer with each of the plurality of scanners;
      upon a first scanner of the plurality of scanners completing scanning of the first allocated memory page buffer, inserting an identifier for the first scanner into the first allocated memory page buffer;
      upon inserting the identifier for the first scanner into the first allocated memory page buffer, determining whether an identifier for each of the plurality of scanners has been inserted into the first allocated memory page buffer; and
      based on the determination, selecting between providing the first allocated memory page buffer to a second scanner of the plurality of scanners and completing the scan of the first allocated memory page buffer.

2. The method of claim 1, wherein the parallel scan further includes:
   inserting additional identifiers into the first allocated memory page buffer when additional scanners of the plurality of scanners complete scanning the first allocated memory page buffer, each additional identifier being accessible by a manager that performs the selecting between providing the first allocated memory page buffer to a second scanner of the plurality of scanners and completing the scan of the first allocated memory page buffer.

3. The method of claim 2, wherein the parallel scan further includes: in response to determining that an identifier for each of the plurality of scanners has been inserted into the first allocated memory page buffer, selecting to complete the scan of the first allocated memory page buffer, wherein completing the scan of the first allocated memory page buffer includes dropping the data packet of the first allocated memory page buffer.

4. The method of claim 1, wherein inserting the identifier for the first scanner in the first allocated memory page buffer includes inserting the identifier for the first scanner at a position in the first allocated memory page buffer after the data packet of the first allocated memory page buffer.

5. The method of claim 1, wherein a scanner of the plurality of scanners aligns the data packet of the first allocated memory page buffer within the first allocated memory page buffer.

6. The method of claim 1, wherein the plurality of scanners includes at least one unprivileged scanner, at least one privileged scanner, and a hardware-based scanner, and wherein, during the parallel scan, the one or more allocated memory page buffers are each accessible to the at least one unprivileged scanner, the at least one privileged scanner, and the hardware-based scanner.

7. The method of claim 6, further comprising:
   mapping the one or more memory page buffers to enable the at least one unprivileged scanner access to the one or more memory page buffers, wherein the at least one unprivileged scanner is unable to access one or more second memory page buffers of the plurality of memory page buffers, and the one or more second memory page buffers are different than the one or more memory page buffers.

8. The method of claim 1, further comprising:
   aligning the data packet of each allocated memory page buffer of the one or more allocated memory page buffers such that a frame of the data packet of each allocated memory page buffer is placed at a constant position in the allocated memory page buffers, wherein the frame is located after header information of the data packet and wherein the aligning results in the data packet of a buffer of the one or more allocated memory page buffers being offset within the buffer, and the offset is from the beginning of the buffer.

9. An apparatus, comprising:
   a processor; and
   a memory storing computer executable instructions that, when executed, cause the apparatus to:
      allocate one or more memory page buffers from a plurality of memory pages, wherein allocating the one or more memory page buffers results in one or more allocated memory page buffers, and, upon completion of the allocating, each allocated memory page buffer of the one or more allocated memory page buffers includes a data packet; and when allocating the one or more memory page buffers is complete, perform a parallel scan of the one or more allocated memory page buffers with a plurality of scanners, wherein the parallel scan includes:
- initiating a scan of a first allocated memory page buffer of the one or more allocated memory page buffers with the plurality of scanners, wherein the scan of the first allocated memory page buffer includes scanning the first allocated memory page buffer with each scanner of the plurality of scanners;
- upon a first scanner of the plurality of scanners completing scanning of the first allocated memory page buffer, inserting an identifier for the first scanner into the first allocated memory page buffer;
- upon inserting the identifier for the first scanner into the first allocated memory page buffer, determining whether an identifier for each of the plurality of scanners has been inserted into the first allocated memory page buffer; and
- based on the determination, selecting between providing the first allocated memory page buffer to a second scanner of the plurality of scanners and completing the scan of the first allocated memory page buffer.

10. The apparatus of claim 9, wherein the parallel scan further includes:
inserting additional identifiers into the first allocated memory page buffer when additional scanners of the plurality of scanners complete scanning the first allocated memory page buffer, each additional identifier being accessible by a manager that performs the selection between providing the first allocated memory page buffer to a second scanner of the plurality of scanners and completing the scan of the first allocated memory page buffer.

11. The apparatus of claim 10, wherein the parallel scan further includes: in response to determining that an identifier for each of the plurality of scanners has been inserted into the first allocated memory page buffer, selecting to complete the scan of the first allocated memory page buffer, wherein completing the scan of the first allocated memory page buffer includes dropping the data packet of the first allocated memory page buffer.

12. The apparatus of claim 9, wherein inserting the identifier for the first scanner in the first allocated memory page buffer includes inserting the identifier for the first scanner at a position in the first allocated memory page buffer after the data packet of the first allocated memory page buffer.

13. The apparatus of claim 9, wherein the plurality of scanners includes at least one unprivileged scanner, at least one privileged scanner, and a hardware-based scanner, and wherein, during the parallel scan, the one or more allocated memory page buffers are each accessible to the at least one unprivileged scanner, the at least one privileged scanner, and the hardware-based scanner.

14. The apparatus of claim 9, the memory further storing computer executable instructions that, when executed, cause the apparatus to:
align the data packet of each allocated memory page buffer of the one or more allocated memory page buffers such that a frame of the data packet of each allocated memory page buffer is placed at a constant position in the allocated memory page buffers, wherein the frame is located after header information of the data packet and wherein the aligning results in the data packet of a buffer of the one or more allocated memory page buffers being offset within the buffer, and the offset is from the beginning of the buffer.

15. A computer readable medium storing computer executable instructions that, when executed, cause a processor to:
allocate one or more memory page buffers from a plurality of memory pages, wherein allocating the one or more memory page buffers results in one or more allocated memory page buffers, and, upon completion of the allocating, each allocated memory page buffer of the one or more allocated memory page buffers includes a data packet; and
when allocating the one or more memory page buffers is complete, perform a parallel scan of the one or more allocated memory page buffers with a plurality of scanners, and wherein the parallel scan includes:
- initiating a scan of a first allocated memory page buffer of the one or more allocated memory page buffers, wherein the scan of the first allocated memory page buffer includes scanning the first allocated memory page buffer with each of the plurality of scanners;
- upon a first scanner of the plurality of scanners completing scanning of the first allocated memory page buffer, inserting an identifier for the first scanner into the first allocated memory page buffer;
- upon inserting the identifier for the first scanner into the first allocated memory page buffer, determining whether an identifier for each of the plurality of scanners has been inserted into the first allocated memory page buffer; and
- based on the determination, selecting between providing the first allocated memory page buffer to a second scanner of the plurality of scanners and completing the scan of the first allocated memory page buffer.

16. The computer readable medium of claim 15, wherein the parallel scan further includes:
inserting additional identifiers into the first allocated memory page buffer when additional scanners of the plurality of scanners complete scanning the first allocated memory page buffer, each additional identifier being accessible by a manager that performs the selection between providing the first allocated memory page buffer to a second scanner of the plurality of scanners and completing the scan of the first allocated memory page buffer.

17. The computer readable medium of claim 16, wherein the parallel scan further includes: in response to determining that an identifier for each of the plurality of scanners has been inserted into the first allocated memory page buffer, selecting to complete the scan of the first allocated memory page buffer, wherein completing the scan of the first allocated memory page buffer includes dropping the data packet of the first allocated memory page buffer.

18. The computer readable medium of claim 15, wherein inserting the identifier for the first scanner in the first allocated memory page buffer includes inserting the identifier for the first scanner at a position in the first allocated memory page buffer after the data packet of the first allocated memory page buffer.

19. The computer readable medium of claim 15, wherein a scanner of the plurality of scanners aligns the data packet of the first allocated memory page buffer within the first allocated memory page buffer.

20. The computer readable medium of claim 15, wherein the plurality of scanners includes at least one unprivileged scanner, at least one privileged scanner, and a hardware-based scanner, and wherein, during the parallel scan, the one or more allocated memory page buffers are each accessible to the at least one unprivileged scanner, the at least one privileged scanner, and the hardware-based scanner.

21. The computer readable medium of claim 15, further comprising instructions that, when executed, cause the processor to:
align the data packet of each allocated memory page buffer of the one or more allocated memory page buffers such that a frame of the data packet of each allocated memory page buffer is placed at a constant position in the allocated memory page buffers, wherein the frame is located after header information of the data packet and wherein the aligning results in the data packet of a buffer of the one or more allocated memory page buffers being offset within the buffer, and the offset is from the beginning of the buffer.

22. An apparatus, comprising:
a queuing task manager configured to allocate one or more memory page buffers from a plurality of memory pages, wherein allocating the one or more memory page buffers results in one or more allocated memory page buffers, and, upon completion of the allocating, each allocated memory page buffer of the one or more allocated memory page buffers includes a data packet; and
a plurality of scanners including at least one unprivileged scanner, at least one privileged scanner, and a hardware-based scanner, wherein the one or more allocated memory page buffers are each accessible to the at least one unprivileged scanner, the at least one privileged scanner, and the hardware-based scanner;
wherein the queuing task manager is further configured to, with the plurality of scanners, perform a parallel scan of the one or more allocated memory page buffers subsequent to completion of the allocating, and wherein the parallel scan includes:
initiating a scan of a first allocated memory page buffer of the one or more allocated memory page buffers, wherein the scan of the first allocated memory page buffers includes scanning the first allocated memory page buffer with each of the plurality of scanners;
upon a first scanner of the plurality of scanners completing scanning of the first allocated memory page buffer, inserting an identifier for the first scanner into the first allocated memory page buffer;
upon inserting the identifier for the first scanner into the first allocated memory page buffer, determining whether an identifier for each of the plurality of scanners has been inserted into the first allocated memory page buffer; and
based on the determination, selecting between providing the first allocated memory page buffer to a second scanner of the plurality of scanners and completing the scan of the first allocated memory page buffer.

23. The apparatus of claim 22, wherein the parallel scan further includes inserting additional identifiers into the first allocated memory page buffer when additional scanners of the plurality of scanners complete scanning the first allocated memory page buffer, each additional identifier being accessible by the queuing task manager when selecting between providing the first allocated memory page buffer to a second scanner of the plurality of scanners and completing the scan of the first allocated memory page buffer.

24. The apparatus of claim 23, wherein the parallel scan further includes: in response to determining that an identifier for each of the plurality of scanners has been inserted into the first allocated memory page buffer, selecting to complete the scan of the first allocated memory page buffer, wherein completing the scan of the first allocated memory page buffer includes dropping the data packet of the first allocated memory page buffer.

25. The apparatus of claim 22, wherein inserting the identifier for the first scanner in the first allocated memory page buffer includes inserting the identifier for the first scanner at a position in the first allocated memory page buffer after the data packet of the first allocated memory page buffer.

26. The apparatus of claim 22, wherein:
a scanner of the plurality of scanners is configured to:
align the data packet of each allocated memory page buffer of the one or more allocated memory page buffers such that a frame of the data packet of each allocated memory page buffer is placed at a constant position in the allocated memory page buffers, wherein the frame is located after header information in the data packet and wherein the aligning results in the data packet of a buffer of the one or more allocated memory page buffers being offset within the buffer, and the offset is from the beginning of the buffer.

27. The method of claim 7, wherein the mapping includes mapping the one or more memory page buffers to virtual memory space of the at least one unprivileged scanner.

* * * * *